United States Patent [19]

Leavines

[11] 4,152,577
[45] May 1, 1979

[54] METHOD OF IMPROVING HEAT TRANSFER FOR ELECTRIC PIPE HEATERS

[76] Inventor: Joseph E. Leavines, 2 Sierra Cir., New Braunfels, Tex. 78130

[21] Appl. No.: 699,158

[22] Filed: Jun. 23, 1976

[51] Int. Cl.² .................. F16L 53/00; H05B 1/00; F28F 13/00
[52] U.S. Cl. ........................... 219/301; 137/341; 138/33; 165/181; 219/311; 219/535; 219/536; 219/549; 338/212
[58] Field of Search ............ 219/301, 311, 535, 436, 219/438, 536, 544, 528, 549, 542, 548; 338/210–214, 203, 244; 137/341; 138/32, 33; 165/179–181

[56] References Cited
U.S. PATENT DOCUMENTS

| | | | |
|---|---|---|---|
| 1,460,815 | 7/1923 | Hymes | 338/244 X |
| 2,111,251 | 3/1938 | Spilsbury | 219/301 UX |
| 2,452,214 | 10/1948 | Vogel et al. | 219/311 |
| 2,494,589 | 1/1950 | Sletmer | 338/203 X |
| 2,585,443 | 1/1952 | Cox | 219/301 UX |
| 2,742,561 | 4/1956 | Flater | 219/311 |
| 3,224,216 | 12/1965 | Crouch | 219/301 UX |
| 3,268,846 | 8/1966 | Morey | 219/549 X |
| 3,398,262 | 8/1968 | Kahn | 219/301 |
| 3,757,086 | 9/1973 | Imdoe | 338/214 X |
| 3,949,189 | 4/1976 | Bilbro et al. | 219/301 |

*Primary Examiner*—A. Bartis
*Attorney, Agent, or Firm*—George W. Rauchfuss, Jr.

[57] ABSTRACT

A method for improving the heat transfer between an elongated electric resistance heating element and a pipe on which the heating element is mounted without use of heat transfer cement comprises utilizing a close fitting elongated rigid channel member to directly cover and press into direct contact with the outer surface of the pipe an elongated electric resistance element arranged lengthwise of the pipe. The heating element has a flat pipe contacting surface and comprises parallel resistance wires encased in a resilient electrically insulating sheath. The channel member is coextensive in length with the heating element and is pressed down against the heating element with substantially uniform pressure and contact to ensure that at least about 25% of the heating element is in continuous contact with the surface of the pipe. The channel member and heating element are entirely devoid of heat transfer cement.

1 Claim, 5 Drawing Figures

METHOD OF IMPROVING HEAT TRANSFER FOR ELECTRIC PIPE HEATERS

BACKGROUND OF THE INVENTION

Electrical resistance heater assemblies for heating pipes are generally known in the art and have been employed for a long period of time. These heated assemblies are disposed externally on the pipes containing the material to be heated. Heretofore, in order to improve the heat transfer from the heater element to the pipe the prior art has generally employed one of two methods. That is, the heater has been installed parallel to the pipe or spiraled around the pipe and then attached to the pipe at approximately one foot intervals by bands. In such a method contact between the heater and the pipe is assured only under the bands and thermal expansion results in air space between the heater and the pipe where the bands do not force the heater to remain in contact with the pipe. Moreover, such bands often result in localized excessive pressure causing mechanical damage to the heater elements.

In another method the heater is enclosed in a cover filled with heat transfer cement generally of a graphite base. Either the cover is preformed with the heat transfer cement situated therein in a putty-like or plastic state as shown for example in U.S. Pat. No. 3,331,946 or the heat transfer cement or material is preshaped or extruded around the heater to conform closely to the inner cavity surface of the cover member and also the other surface of the cement or material is preshaped or extruded to conform closely to the shape of the pipe surface on which it is mounted, as shown for example in U.S. Pat. No. 3,834,458 and 3,949,189. While this latter method is designed to eliminate the undesirable air gaps between the heater and the pipe and to improve the conductance of heat between the heater element and the pipe it has been found that the efficiency of such a system still depends too heavily upon the personnel handling and installing the putty-like heat transfer cement or material and that although the elimination of air gaps was desired this elimination has not been dependably obtained. Furthermore, the handling or use of such heat transfer cement or material is both cumbersome and expensive.

SUMMARY OF THE INVENTION

The present invention thus relates to a novel method of mounting pipe heaters on pipes and obtaining good heat transfer between the heater element and the pipe yet without requiring the use of heat transfer cement or material. By the method of this invention the heat transfer between the pipe and the pipe heater is maintained at a high level and the errors due to unskilled personal handling and installing heat transfer cement or material is eliminated. In fact the use of any heat transfer cement or material is completely eliminated thereby eliminating a substantial cost item in such installations. According to the present invention electrical heater elements are mounted on pipes to be heated and the heater elements are covered with rigid elongated channel members that are close fitting so that the channel members press down against the heater elements with sufficient and substantial uniformity of pressure and contact so that the heat transfer between the heater element and the pipe is such that it is substantially comparable to a well installed system using heat transfer cement as disclosed by the prior art patents. That is it has been unexpectedly found that the use of such heat transfer cement or material is not required or needed in order to obtain desirable heat transfer between the heater element and the pipe to be heated. Additionally it has unexpectedly been found that the use of such close fitting channels that contact and press down on the heater elements gives a heat transfer system wherein the heat transfer coefficient of the system is substantially equal to or better than an equivalent system employing heat transfer cement according to the prior art. Moreover, quite unexpectedly, it has been discovered that although there is contact between the closely fitting channel and the electric heater this does not result in undue dissipation of heat to the external channel surface and thus to the atmosphere and thereby no undue adverse effect on the heat transfer coefficient to an extent that it would result in a heat transfer coefficient for the system less than could by obtained with the use of heat transfer cement or material.

The present invention provides substantially continuous contact between the heater and the pipe by pressing the heater element against the pipe with substantially uniform force along the length of the pipe. Eliminated according to the method of this invention is the necessity for a heat transfer cement or material either in the cover or preshaped or extruded on the heater before it is encased in a cover

BRIEF DESCRIPTION OF THE DRAWINGS

The invention will be more readily understood from a reading of the following specification and by reference to the accompanying drawings forming a part thereof, wherein like reference numerals refer to the same elements in each of the Figures, and wherein.

DESCRIPTION OF THE PREFERRED EMBODIMENTS

Figure 1:
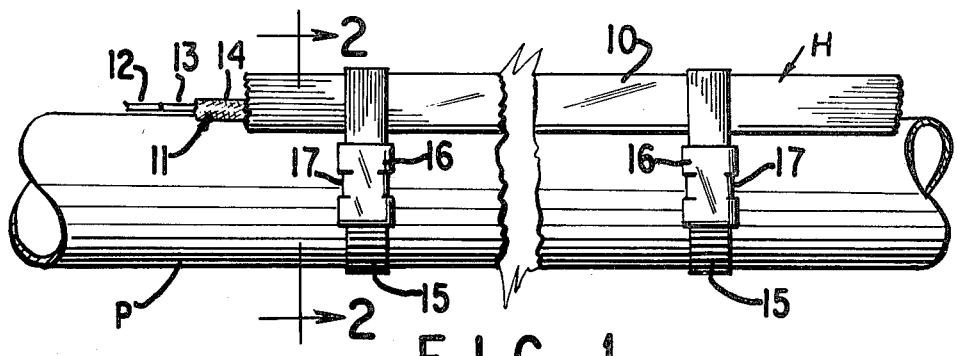
FIG. 1 is a view, partly in elevation and partly in section, illustrating an assembled heat transfer system constructed according to this invention.

In the drawings the letter H designates generally the heat transfer apparatus according to this invention. Said apparatus H is adopted to be mounted on and secured to a pipe, indicated by the letter P, to be heated. In general the heat transfer apparatus includes a rigid channel or cover 10 which is adapted to be positioned over an electric heating element or elements 11 whereby effective and efficient heat transfer is accomplished without a great temperature differential between the temperature of the heater and the temperature of the pipe surface and thus the temperature of any fluid flowing in the pipe.

The heating element or elements 11 is generally in the form of a pair of parallel resistance electrical wires 12 and 13 which are capable of performing as resistance heaters when connected to a source of electric current and constructed in accordance with techniques known in the art. Normally these electrical resistance heating wires 12 and 13 are encased in electrical insulating material in the form of a resilient braid or sheath 14 to form the completed electric heating element. These heaters have a generally flat or semi-flat surface for contacting the surface of the pipe.

In accordance with this invention the channel members 10 are of a size and shape such that when employed to cover a heating element 11 the cover presses the heater down against the surface of the pipe with sufficient uniformity of pressure and contact that acceptable heat transfer is obtained. comparable to that realized when using heat transfer cement according to the prior art. The channels or covers 10 are sized and shaped to ensure that the surface of the heater elements 11 contact the surface area of the pipe P with at least about 25% or more of the heater element surface.

Whereas the channels and covers previously utilized in the art were of a size that the channels and covers did not come into contact with the surface of the heater elements, and in fact were sized and shaped so as to provide sufficient room for large quantities of heat transfer cement, it is to be noted that the channels or covers employed in accordance with the procedures of this invention are such that sufficient contact between the channels or covers 10 and the heater elements 11 is provided for so that the heater element 11 is pressed down against the pipe P with sufficient uniformity of pressure and contact for acceptable heat transfer to be obtained without the necessity for heat transfer cement. According to the previous thinking in the field to which this invention pertains it was considered completely undesirable for a channel or cover to contact a heater element and it was likewise considered necessary to employ heat transfer cement in such channels or covers.

However, according to the present invention it has been found, contrary to all previous thinking in the field, that acceptable and in some cases superior heat transfer is obtained if the procedure of this invention is employed in installing electric heater elements on pipes to be heated. According to the procedure of this invention an electric heater element or elements 11 is placed on a pipe P and a channel or cover 10 shaped and sized to contact the heating element 11 in such a manner as to press the heater element 11 against the pipe surface with sufficient uniformity of pressure and contact so as to cause at least about 25% or more of the heater surface to be forced into contact with the surface of a pipe. The channel or cover 10 has to be sized so that it will force the electric heater 11 against the pipe before the edges 21 and 22 of the channel or cover 10 come into contact with the pipe surface.

The channels or covers 10 will be secured to the pipe by any suitable securing means such as for example, by spaced bands or straps 15 formed of metal or any other acceptable material. These bands or straps 15 are in most instances fixedly secured around the pipe P and the channel or cover member 10 by any type of locking element 16, such as, for example, a crimped locking element as shown in FIG. 1 where the locking element 16 is shown with crimps 17 of suitable conventional construction for securing bands or straps.

The term pipe as used in this invention is understood to include pipes, conduits or other enclosed tubular members for the transfer of fluids to be heated by an electrical heater element.

Figure 2:
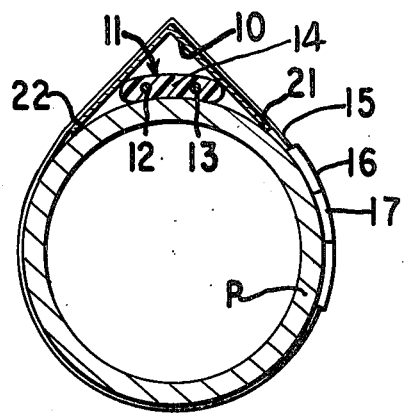
FIG. 2 is a vertical sectional view taken along line 2—2 of FIG. 1.
Figure 4:
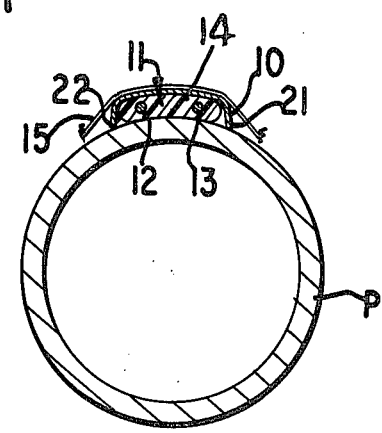
FIG. 4 is a vertical sectional view similar to FIG. 2 but illustrating a modified shape for the channel cover during its use over the electrical heater element in accordance with the invention.
Figure 3:
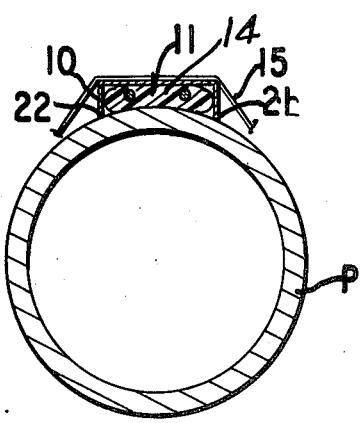
FIG. 3 is a vertical sectional view similar to FIG. 2 but illustrating a modified shape for the channel cover during its use over the electrical heater element in accordance with the invention.
Figure 5:
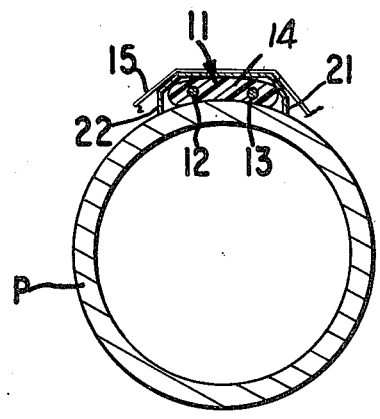
FIG. 5 is another vertical sectional view similar to FIG. 2 but illustrating a still further modified shape for the channel cover during its use over the electrical heater element in accordance with this invention.

The channel or cover 10 may be of any suitable shape as illustrated for instance in FIGS. 2-5 but in each instance, the channel or cover 10 is sized and shaped to press the heater element 11 down against the pipe surface with substantially uniform pressure and contact to provide acceptable heat transfer without the use of a heat transfer cement. As shown in FIG. 2 the channel or cover 10 may be angle shaped, preferably 90°, open-sided rectangular as shown in FIG. 3, it may be tubular or oval as shown in FIG. 4 or even trapezoidal in cross-section as shown in FIG. 5. It will be appreciated, however, that such shapes as illustrated in FIGS. 2-5 are merely illustrative and not in any way limiting of acceptable shapes and that the channels or covers 10 are not limited to any particular shape of the channel member. It is only necessary that whatever shape is chosen it be such that when employed as a cover for an electric heater element it press the electric heater element down against the pipe surface with uniform pressure and contact and that said channels 10 or cover contact the heater elements 11 before the edges of the channel or cover come in contact with the pipe surface.

The channel or cover 10 is formed of rigid material, generally steel and may be, for example, a one-half inch sized 90° angle iron for use with small electric heater elements or five-eights inch sized 90° angle iron for larger sized electric heater elements. The channels or covers are preferably used in the form of galvanized metal angles.

The length of the channel or cover 10 may be substantially the same length as the length of the electric heating element 11, or if desired and as is generally the case, the channel or cover 10 may be formed by a plurality of relatively short lengths, for example three or four foot lengths, which are laid end to end and joined together when applied to the electric heating element 11 and pipe P so as to completely cover the heating element 11

The foregoing disclosure and description of the present invention are illustrative of the invention and various changes in size and shape of the channels or covers as well as in the details thereof may be made within the scope of the following claims without departing from the spirit or intent of the invention.

I claim:

1. A method of installing elongated electric resistance heating elements on pipes for heating and maintaining the temperature of fluids in said pipe without the use of heat transfer cement to ensure adequate heat transfer from the heating element to the pipe yet obtaining a heat transfer system where the heat transfer coefficient of the system is substantially equal to or better than an equivalent system employing heat transfer cement comprising disposing an elongated electric heating element, having parallel electrical resistance wires encased in a resilient electrical insulating sheath, completely devoid of heat transfer cement and having a flat pipe contacting surface on the surface of the pipe to be heated with the heating element extending lengthwise of the pipe, covering and directly contacting said electric heating element with an elongated rigid channel member coextensive in length with said heating element and devoid of heat transfer cement and with said channel member closely fitting said heating element, pressing said channel member against said heating element with sufficient force and in a manner such that the rigid channel member presses down against the heating element with sufficient and substantially uniform pressure and contact to cause at least about 25% of the heating element surface to be pressed into intimate contact with the surface area of the pipe, said channel member being sized so that it will force the electric heating element against the pipe surface to produce said at least 25% surface contact of the heating element with the pipe before the edges of the channel member come in contact with the pipe surface and securing said channel member in place on the pipe to maintain said intimate pressure contact between the heating element surface and the pipe surface.

* * * * *